No. 864,652. PATENTED AUG. 27, 1907.
W. J. KING.
COUPLING DEVICE.
APPLICATION FILED APR. 23, 1906.

WITNESSES:

INVENTOR
W<sup>m</sup> J. King.
BY
Milo B. Stevens & Co
Attorneys

UNITED STATES PATENT OFFICE.

WILLIAM JOSEPH KING, OF WATERVALLEY, MISSISSIPPI.

COUPLING DEVICE.

No. 864,652.

Specification of Letters Patent.

Patented Aug. 27, 1907.

Application filed April 23, 1906. Serial No. 313,211.

*To all whom it may concern:*

Be it known that I, WILLIAM JOSEPH KING, a citizen of the United States, residing at Watervalley, in the county of Yalobusha and State of Mississippi, have invented new and useful Improvements in Coupling Devices, of which the following is a specification.

This invention is a coupling device in the form of a double hook adapted to be used for mending or connecting the ends of chains, or for attaching the chain to an object, and the particular object of the invention is to form a hook which will not become accidentally unhooked.

The invention is illustrated in the accompanying drawings, in which

Figure 1:
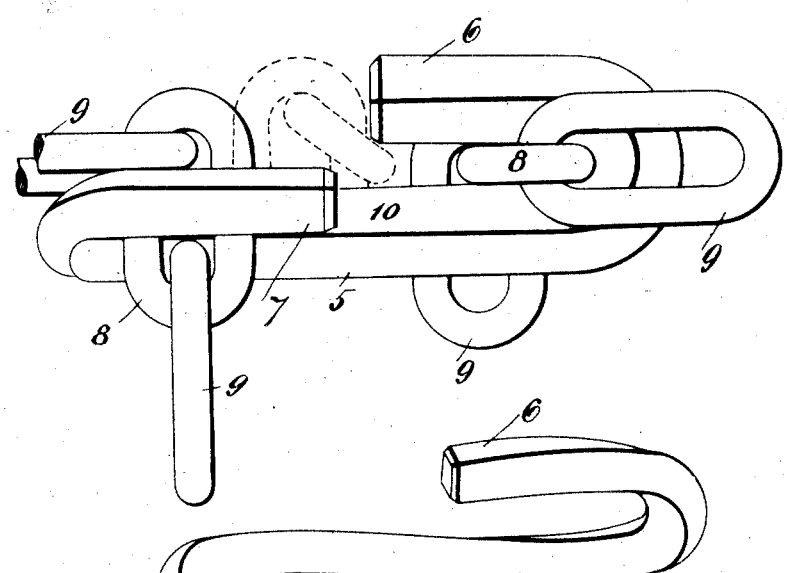
Figure 2:
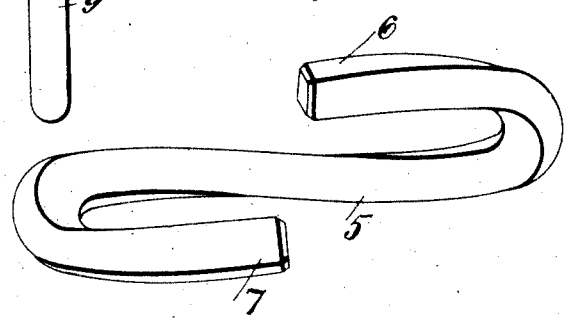
Figure 3:
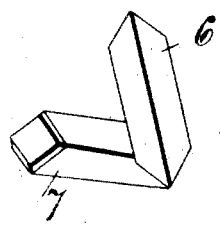

Figure 1 is a side view showing the hook connecting the ends of chains. Fig. 2 is a perspective view of the device looking into or toward the angle between the hooks. Fig. 3 is an end view of the device.

Referring specifically to the drawings, 5 indicates a straight shank having at one end a hook 6, and at the opposite end an oppositely-presented hook 7, which extends from the shank in a plane substantially at a right angle to the plane of the hook 6. Both hooks extend substantially parallel to the shank in one plane, and are canted slightly toward each other. By canted slightly I mean to say that the ends or bills of the hook are turned slightly toward each other bringing them closer together than if they were exactly at a right angle to each other, and by thus canting the hooks slightly toward each other the tip or end of each hook forms a stop against which a link tending to slide or back out of the other hook will come in contact, thus forming a stop, which will prevent the link slipping out unless it be slightly twisted or turned up to avoid said stop or end. Thus, as illustrated in Fig. 1, the links 8 of the chains are engaged in the hooks, which hold against the loose links 9. If the chain be slack, the link 8 may slide along the hook toward the mouth thereof, but at that point it will contact against the end 10 of the opposite hook, which will act as a stop to prevent the link from passing entirely out of the hook. It can, however, be disengaged by manipulation, by slacking the chain and twisting the link 8 and lifting the same until it will pass above or escape the said end or stop. In other words, to remove the link 8 it has to be partially turned or rotated on its longitudinal axis and also tilted to a slight inclination to pass out the mouth of its hook. The corners of the bar, being presented toward each other in the hooks, form good holding edges, and the diagonal presentation also allows the tilting action referred to.

I claim:

1. A coupling device comprising a shank having at its ends oppositely presented hooks extending from the shank at an angle to each other slightly less than a right angle, with the end of one hook canted toward and in line with the mouth of the other hook, forming a stop therefor.

2. A coupling device comprising a bar rectangular in cross section and bent to form a shank and two hooks extending from the shank at an angle to each other slightly less than a right angle, the bends being formed across the diagonals of the bar, with corners opposite each other, in the hooks.

In testimony whereof I have signed my name to this specification in the presence of two subscribing witnesses.

WILLIAM JOSEPH KING.

Witnesses:
T. L. BENNETT,
J. H. MCMILLAN.